(12) United States Patent
Renke et al.

(10) Patent No.: US 8,511,582 B2
(45) Date of Patent: Aug. 20, 2013

(54) SELECTABLE WINDSHIELD WASHER SPRAY PATTERN

(75) Inventors: David T. Renke, Macomb, MI (US); Thomas W. Cox, Lapeer, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 13/102,396

(22) Filed: May 6, 2011

(65) Prior Publication Data

US 2012/0280060 A1　Nov. 8, 2012

(51) Int. Cl.
*B05B 1/10* (2006.01)

(52) U.S. Cl.
USPC ..................... 239/284.1; 239/284.2

(58) Field of Classification Search
USPC .................. 239/284.1, 284.2, 548, 549, 551, 239/553.3, 553.5, 562
See application file for complete search history.

(56) References Cited

U.S. PATENT DOCUMENTS

| | | | | |
|---|---|---|---|---|
| 6,062,491 A | * | 5/2000 | Hahn et al. | 239/284.2 |
| 6,561,209 B2 | * | 5/2003 | Wojan et al. | 137/79 |
| 6,669,110 B2 | * | 12/2003 | Fukushima | 239/284.2 |
| 7,014,131 B2 | * | 3/2006 | Berning et al. | 239/589.1 |
| 2004/0251315 A1 | * | 12/2004 | Maruyama et al. | 239/284.1 |
| 2008/0142619 A1 | * | 6/2008 | Kim | 239/284.1 |

OTHER PUBLICATIONS

Windshield washer fluid spray nozzle products of General Motors, LLC, 1 page, dated at least as early as Jan. 1, 2010.
"Spray Nozzle", Wikipedia, http://en.wikipedia.org/wiki/Spray_nozzle, 10 pages, dated Mar. 26, 2011.

* cited by examiner

*Primary Examiner* — Davis Hwu

(57) ABSTRACT

A multi-nozzle spray head washer fluid delivery system which utilizes both a wide spray pattern nozzle and a narrow spray pattern nozzle to provide selective adjustment of the spray pattern delivered to the surface of the windshield. A control system incorporates either or both of an autonomous selection of spray pattern and driver selection of spray pattern.

10 Claims, 4 Drawing Sheets

SELECTABLE WINDSHIELD WASHER SPRAY PATTERN

TECHNICAL FIELD

The present invention relates, in general, to the spraying of windshield washer fluid onto windshields. More particularly, the present invention relates to selectable control of the width of the spray pattern of windshield washer fluid onto the windshield.

BACKGROUND OF THE INVENTION

A windshield, or windscreen, is a front facing window which protects the driver and other vehicle occupants from wind, flying debris, and inclement weather. While providing protection, windshields tend to accumulate dirt and other substances, such as road salt, which, because they obscure vision and tend to stick to the windshield, need to be washed off.

A typical windshield wiper consists of a rubber wiper blade attached to a wiper arm which pivots so as to cause the rubber blade to wipe water, snow, etc. from the surface of the windshield. Other types of windshield debris, particularly dry materials, require a washer fluid delivery system for their removal, wherein the washer fluid serves as a softening solvent for this material.

A conventional washer fluid delivery system consists of a reservoir, a pumping mechanism and a nozzle. The nozzle is configured to provide a uniform spray of fluid over critical debris removal areas of the windshield. The fluid is sprayed onto the windshield, and the wiper system is operated so as to remove dirt, salt, and other debris from the windshield. The nozzle is designed to optimize performance in such a fashion as to minimize the amount of wiping required to clear the windshield of debris.

Turning now to the Drawings, FIGS. 1 through 3 depict a conventional motor vehicle windshield, conventional windshield wipers and a conventional prior art windshield washer fluid delivery system used in association therewith.

FIG. 1 shows a windshield 10 and, abutting thereto, a pair of windshield wipers 12, each including a rubber wiper blade 14 attached to a reciprocally movable wiper arm 14', wherein the windshield wipers are configured to facilitate removal of precipitation falling or splashed onto on the windshield, whereby the driver is provided a clear view of the road despite inclement weather. The windshield 10 has disposed in adjacency thereto a pair of spray heads 16 (one spray head for each windshield wiper), each spray head has a nozzle body which has disposed therein a nozzle which emits at a nozzle orifice thereof a wide spray pattern 18 onto the surface of the windshield 10. Similarly to FIG. 1, FIG. 2 depicts the windshield 10 and windshield wipers 12 including the wiper blades 14 and wiper arms 16, wherein now the nozzle body 16' of each spray head has disposed therein a nozzle which emits at its nozzle orifice a narrow spray pattern 18' onto the surface of the windshield 10.

FIG. 3 is a diagram of a conventional prior art windshield washer fluid delivery system 40. The driver of the motor vehicle activates a switch 20 which produces a demand for windshield washer fluid at a conventional washer fluid control module 22 via data line 24. The washer fluid control module actuates a washer fluid pump 28 via data line 26. Washer fluid 30 is then drawn from a washer fluid reservoir 32 through a washer fluid supply line 34 to the washer fluid pump and thereupon pressured out through a washer fluid supply delivery line 36. The washer fluid delivery line 36 is connected to both of the spray heads 16 through the nozzle body thereof to a wide spray pattern nozzle 38 (in the operative case of FIG. 1). The pressurized washer fluid then passes out through a wide spray pattern nozzle orifice 38' of the wide spray pattern nozzle, whereupon the emitted wide spray pattern 18 is directed to the windshield as shown at FIG. 1.

Spray nozzle technology is notoriously well known in the art. Generally speaking, the configuration of the nozzle orifice dictates the nature of the spray pattern produced by the nozzle, wherein the nozzle orifice utilizes the kinetic energy of a pressurized liquid moving through the nozzle to break the liquid up into an airborne spray consisting of collection of moving droplets due to the pressure drop upon exit of the nozzle orifice. The size and shape of the nozzle orifice determines how broadly dispersed the droplets will be upon exit from the nozzle orifice, thereby effecting specification of the width of the spray pattern the nozzle produces. For example, a cylindrically-shaped nozzle orifice opening may provide a narrow spray pattern, while a V-notch shaped nozzle orifice opening may provide a wide spray pattern.

In general, a spray can be envisioned as a collection of liquid droplets moving through air, having both speed and momentum which are influenced by the relative movement of the air. The trajectory of the collection of droplets constituting the spray may be predictable and moderately influenced by the air when the air has laminar flow and is relatively slow moving, as for example when a motor vehicle is traveling at slower speeds. However, the trajectory of the collection of droplets constituting the spray can be unpredictable and greatly influenced when the air is buffeting and is relatively fast moving, as for example when a motor vehicle is moving at higher speeds. Accordingly, when a motor vehicle is moving at relatively high speed, the washer fluid spray can be erratic, missing the intended target location of the windshield, even loosing a quantity of the spray to the air itself, never even reaching the windshield. This phenomenon of vehicle speed and windshield washer speed is exacerbated for wide spray patterns. Problematically, a narrow spray pattern (as for example shown at FIG. 2), although less susceptible to the vagaries of wind interaction, has the disadvantage that a lesser area of the windshield will be exposed to the spray.

Accordingly, what remains needed in the art is to somehow provide selection of washer fluid spray pattern width based upon either or both of an autonomous selection and a driver selection, so as to thereby provide an optimal spray pattern adapted for best wetting of the windshield under varying environmental conditions.

SUMMARY OF THE INVENTION

The present invention provides selection of washer fluid width of spray pattern based upon either or both of an autonomous selection and a driver selection, so as to thereby provide an optimal spray pattern adapted for best wetting of the windshield under varying environmental conditions; in particular, providing a wide spray pattern on the windshield surface during lesser windy vehicle operating conditions and a narrow spray pattern on the windshield during higher windy vehicle operating conditions. This selection of spray allows for compensation for vehicle speed and other factors of importance to the driver whereby each selected washer fluid spray pattern provides a best rinsing of the windshield in conjunction with the operating conditions of the motor vehicle.

The present invention utilizes a multi-nozzle spray head which includes both a wide spray pattern nozzle and a narrow spray pattern nozzle to provide selective adjustment of the spray pattern delivered to the surface of the windshield. A control system incorporates either or both of an autonomous selection of spray pattern and a driver selection of spray pattern.

In the autonomous mode of operation, vehicle speed is monitored, and an electronic control module determines, according to programming, which nozzle of the wide and narrow spray pattern nozzles is to supply washer fluid to the windshield in response to a driver command for washer spray, wherein at or below a predetermined threshold speed, the wide spray pattern nozzle is selected, and for vehicle speeds above the threshold speed, the narrow spray pattern nozzle is selected. In a form of the present invention, the driver may override the autonomous selection made by the electronic control module in order to suit a particular desire.

Accordingly, it is an object of the present invention to provide selection of washer fluid spray pattern width based upon either or both of an autonomous selection and a driver selection, so as to thereby provide an optimal spray pattern adapted for best wetting of the windshield under varying environmental conditions.

This and additional objects, features and advantages of the present invention will become clearer from the following specification of a preferred embodiment.

DESCRIPTION OF THE PREFERRED EMBODIMENT

Figure 1:
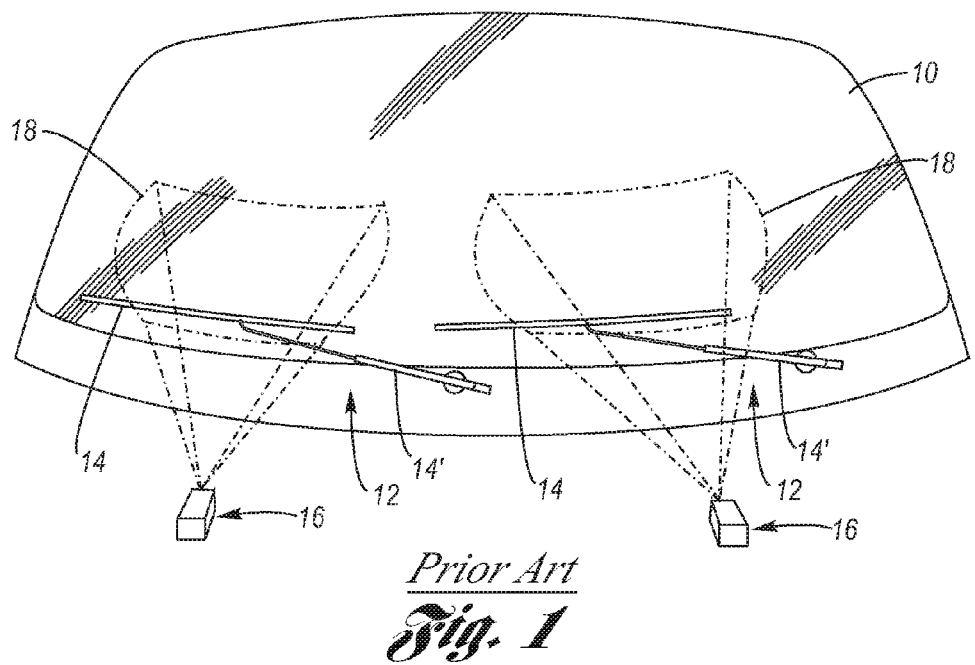
FIG. 1 is a front view of a windshield with wipers, depicting prior art nozzle bodies of a prior art washer fluid delivery system in operation spraying washer fluid in a wide spray pattern.
Figure 2:
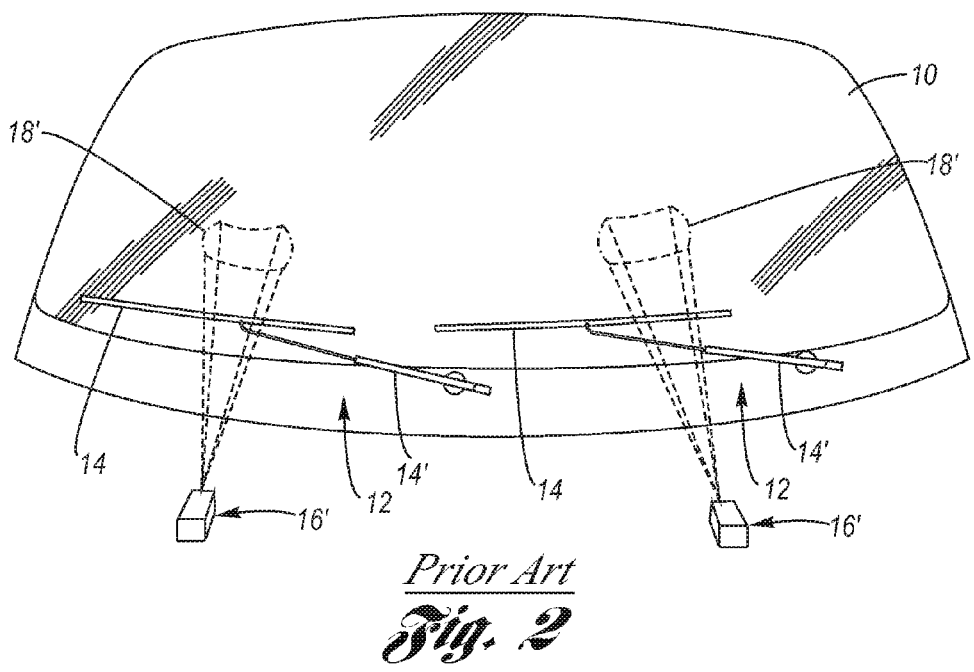
FIG. 2 is a front view of a windshield with wipers, depicting prior art nozzle bodies of a prior art washer fluid delivery system in operation spraying washer fluid in a narrow spray pattern.
Figure 3:
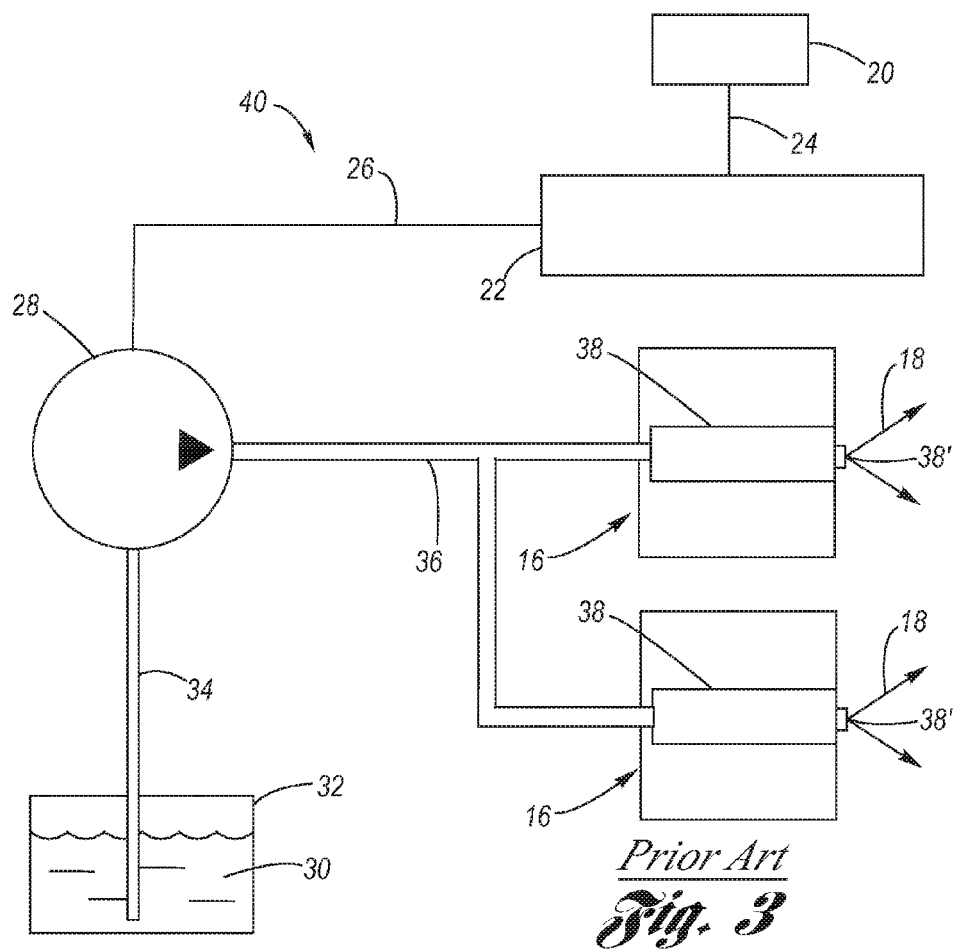
FIG. 3 is a schematic diagram of a prior art washer fluid delivery system.

Referring now to the Drawing, FIGS. 4 through 8 depict examples of a multi-nozzle spray head washer fluid delivery system in accordance with the present invention which provides a selectable washer fluid spray pattern appropriate to environmental conditions of the motor vehicle. The following description of the preferred embodiment is merely exemplary in nature and is not intended to limit the invention, its applications, or its uses.

Figure 4:
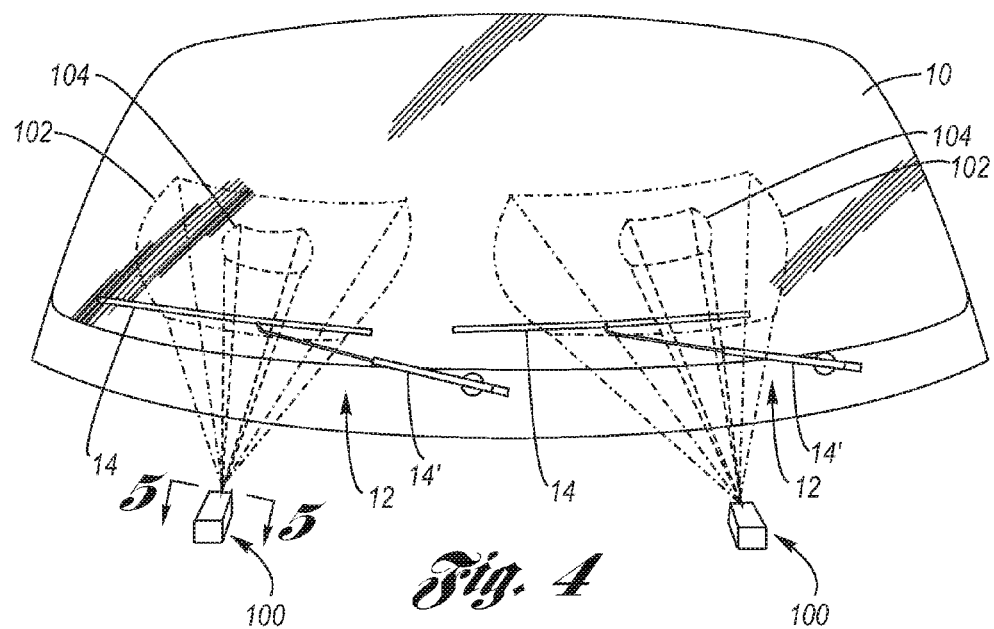
FIG. 4 is a front view of a windshield with wipers, depicting multi-nozzle spray heads of a washer fluid delivery system according to the present invention, shown in operation spraying washer fluid in either a wide spray pattern or alternatively a narrow spray pattern.

FIG. 4, in consonance with FIG. 1, shows a windshield 10 and a pair of windshield wipers 12, each inclusive of a wiper blade 14 attached to a reciprocally movable wiper arm 14'.

FIG. 4 additionally depicts a pair of multi-nozzle spray heads 100 (one multi-nozzle spray head for each windshield wiper) which are components of a multi-nozzle spray head washer fluid delivery system 200 (see FIG. 7) according to the present invention. The multi-nozzle spray head 100 provides either a wide spray pattern 102 or narrow spray pattern 104 onto the surface of the windshield 10.

Figure 5:
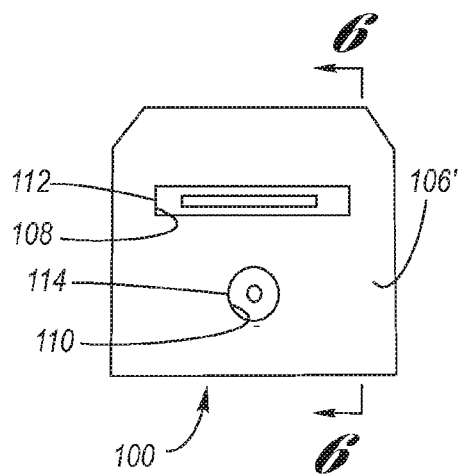
FIG. 5 is a front elevational view of a multi-nozzle spray head according to the present invention
Figure 6:
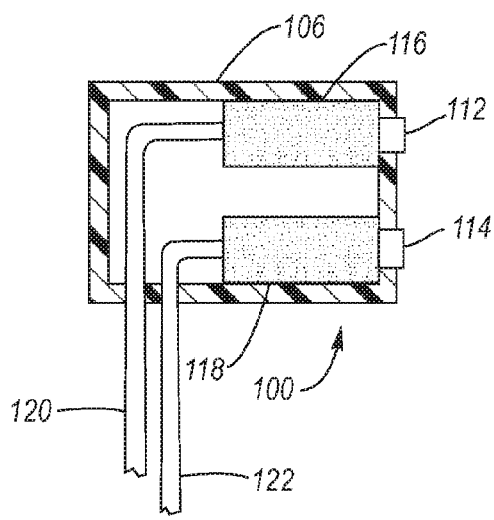
FIG. 6 is a cross section view, seen along line 6-6 of FIG. 5.

FIGS. 5 and 6 detail an example of the multi-nozzle spray head 100. Resident within a nozzle body 106 of the multi-nozzle spray head 100 is a wide spray pattern nozzle 116 and a narrow spray pattern nozzle 118. At the front face 106' of the multi-nozzle body are openings 108, 110, respectively for the wide spray pattern orifice 112 of the wide spray pattern nozzle 116, and narrow spray pattern orifice 114 of the narrow spray pattern nozzle 118. The wide spray pattern orifice 112 may utilize, for example, a V-shaped notch opening, whereas the narrow spray pattern orifice 114 may utilize, for example, a cylindrically-shaped opening.

Washer fluid is delivered by the multi-nozzle washer fluid delivery system (see FIG. 7) firstly via a wide spray pattern nozzle delivery line 120 through the nozzle body 106 to the wide spray pattern nozzle 116, whereupon it exits at the wide spray pattern nozzle orifice 112, and secondly via a narrow spray pattern nozzle delivery line 122 through the nozzle body 106 to the narrow spray pattern nozzle 118, whereupon it exits at the narrow spray pattern orifice 114.

Figure 7:
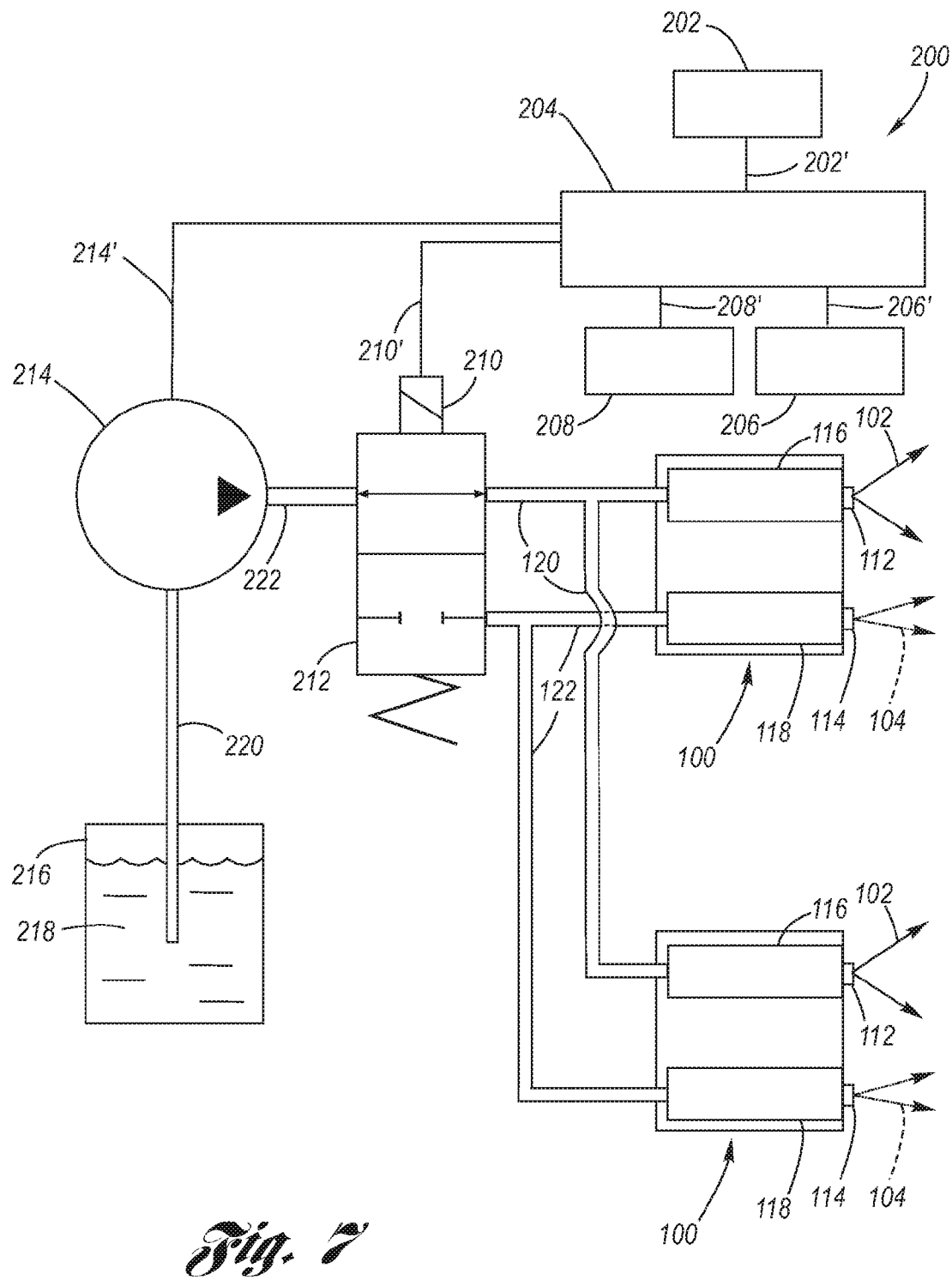
FIG. 7 is a schematic diagram of a multi-nozzle spray head washer fluid delivery system according to the present invention.

FIG. 7 shows schematically an example of the multi-nozzle spray head windshield washer fluid delivery system 200 in accordance with the present invention. The driver (or operator) of the motor vehicle activates a switch 202 which sends a command, via a data line 202', to an electronic control module (ECM) 204 that washer fluid spray is requested. Additionally, if provided, the driver may have also pre-selected a wide spray pattern or a narrow spray pattern modality of washer fluid spray via a selector switch 206 which connects to the ECM 204 via a data line 206'. The ECM 204 additionally receives vehicle speed data from a vehicle speed sensor 208 via a data line 108'. Based on these inputs to the ECM 204 and its inherent programming, the ECM 204 issues a command, via data line 210', to a spray delivery selector to select one or the other of the wide and narrow spray pattern delivery lines. By way of example of a spray delivery selector, the command is sent, via data line 210', to the solenoid 210 of a solenoid switch 212 to select delivery connection to the multi-nozzle spray head 100 either via the wide spray pattern delivery line 120 or the narrow spray pattern delivery line 122 (selection of the wide spray delivery line 120 being shown merely by way of illustration). The selection of spray nozzle via the solenoid valve may be autonomously performed responsive to vehicle speed, responsive to driver command, or responsive to both wherein the driver command is given precedence. The ECM additionally issues a command, via data line 214', to the washer fluid pump 214 to commence pumping washer fluid 218 from the washer fluid reservoir 216 via a fluid extraction line 220, whereupon pressurized washer fluid is delivered to the solenoid switch 212 via a fluid delivery line 222.

If the command of the ECM 204 is to utilize the wide spray pattern nozzle 116 (as illustrated) then the washer fluid passes from the fluid delivery line 222, through the solenoid valve 212, through the wide spray pattern delivery lines 120, through the wide spray pattern nozzles 116 and exits at the wide spray pattern nozzle orifices 112 as the wide spray pattern 102 of washer fluid 218. However, if the command of the ECM 204 is to utilize the narrow spray pattern nozzle 118, then the washer fluid passes from the fluid delivery line 222, through the solenoid valve 212, through the narrow spray pattern delivery lines 122, through the narrow spray pattern nozzles 118 and exits at the narrow spray pattern nozzle orifices 114 as the narrow spray pattern 104 (shown in phantom in FIG. 7) of washer fluid 218.

Figure 8:
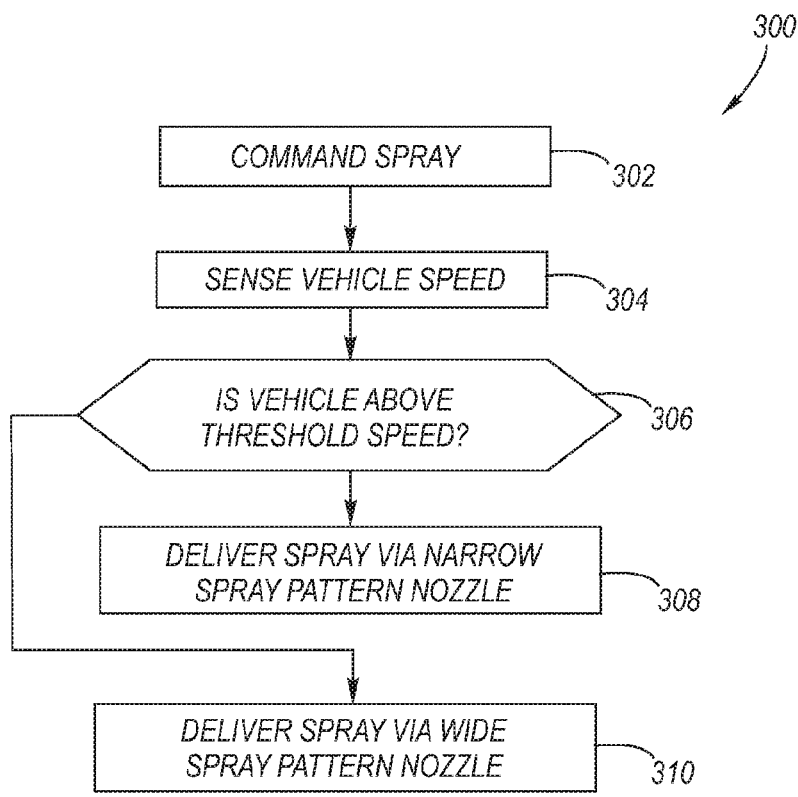
FIG. 8 is a block diagram, of an algorithm of operation of an autonomous mode operation of the multi-nozzle spray head washer fluid delivery system according to the present invention.

FIG. 8 is a block diagram depicting an example a control algorithm for the multi-nozzle spray head windshield washer deliver system 200 when it is in automatic mode, wherein Table I correlates descriptions with the depicted blocks.

TABLE I

| Block | Description |
| --- | --- |
| 302 | COMMAND SPRAY |
| 304 | SENSE VEHICLE SPEED |
| 306 | IS VEHICLE SPEED ABOVE THRESHOLD SPEED? |
| 308 | DELIVER SPRAY VIA NARROW SPRAY PATTERN NOZZLE |
| 310 | DELIVER SPRAY VIA WIDE SPRAY PATTERN NOZZLE |

At Block 302 the driver of the motor vehicle issues instructions to the ECM to provide spray of washer fluid for the windshield. At Block 304 the vehicle speed is sensed and provided to the ECM. At Decision Block 306 inquiry is made as to whether the sensed vehicle speed is above a pre-determined threshold speed value, for example 35 miles per hour. This threshold speed is predetermined such that for speeds at and below the threshold speed value, the washer spray is not considered to be untowardly affected by wind of vehicle movement and the wide spray pattern modality may be used; however, for speeds above the threshold speed value, the washer spray is considered to be untowardly affected by the wind of vehicle movement and the narrow spray pattern modality should be used.

Accordingly, if the sensed vehicle speed exceeds the predetermined threshold vehicle speed, then Decision Block 308 passes to Block 308, whereat the ECM commands the solenoid valve to deliver washer fluid to the narrow spray pattern delivery line. However, if the vehicle speed is at or below the threshold vehicle speed, then Decision Block 306 passes to Block 310, whereat the ECM commands the solenoid valve to deliver washer fluid to the wide spray pattern delivery line.

For illustrative purposes, several non-limiting scenarios of operation of the present invention will now be described, in each scenario the threshold vehicle speed is 35 miles per hour merely as an illustration.

In a first scenario of operation, the vehicle is traveling at 20 miles per hour which is well below the exemplar threshold speed value of 35 miles per hour. In automatic mode, the fluid is sprayed through the wide spray pattern nozzle 116 and a wide spray pattern 102 is provided to the surface of the windshield 10.

In a second scenario of operation, the vehicle is traveling at 65 miles per hour, which is well above the exemplar threshold speed value of 35 miles per hour. In automatic mode, the fluid is sprayed through the narrow spray pattern nozzle 118 and a narrow spray pattern 104 is provided to the surface of the windshield 10.

In a third scenario of operation, the vehicle is traveling at 30 miles per hour. While this speed is below the exemplar threshold speed of 35 miles per hour, so that the autonomous selection would be to select the wide spray pattern nozzle 116, the driver elects to override the automatic system selection and instead selects the narrow spray pattern nozzle 118 in order to deliver a stream-like spray so as to more closely fall upon a bird dropping.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A multi-nozzle spray head for a windshield washer spray system comprising:
   a nozzle body;
   a first nozzle housed by said nozzle body, said first nozzle having a first nozzle orifice, said first nozzle orifice being structured to provide a wide spray pattern outwardly from said nozzle body;
   a spray delivery selector having an input, a first output and a second output, said spray delivery selector selectively connecting either one of said first and second outputs to said input, said input being adapted to connect to the windshield washer spray system;
   a first nozzle hose connection adapted to connect said first nozzle to said first output;
   a second nozzle housed by said nozzle body, said second nozzle having a second nozzle orifice, said second nozzle orifice being structured to provide a narrow spray pattern, which is narrower than said wide pattern spray, outwardly from said nozzle body;
   a second nozzle hose connection adapted to connect said second nozzle to said second output.

2. A multi-nozzle spray head windshield washer spray system for a motor vehicle, said system comprising:
   a windshield washer spray system comprising:
      a washer fluid delivery system; and
      a spray delivery selector having an input connected with said washer fluid delivery system, said spray delivery selector having a first selectable output and a second selectable output; and
   at least one multi-nozzle spray head comprising:
      a nozzle body;
      a first nozzle housed by said nozzle body, said first nozzle having a first nozzle orifice, said first nozzle orifice being structured to provide a wide spray pattern outwardly from said nozzle body;
      a first nozzle hose connection connecting said first selectable output of said spray delivery selector to said first nozzle;
      a second nozzle housed by said nozzle body, said second nozzle having a second nozzle orifice, said second nozzle orifice being structured to provide a narrow spray pattern, which is narrower than said wide spray pattern, outwardly from said nozzle body; and
      a second nozzle hose connection connecting said second selectable output of said spray delivery selector to said second nozzle;
   wherein when said spray delivery selector selects said first selectable output thereof, then said first nozzle provides said wide spray pattern; and wherein when said spray delivery selector selects said second selectable output thereof, then said second nozzle provides said narrow spray pattern.

3. The system of claim 2, further comprising a manually actuated switch which actuates the selection by said spray delivery selector of any of said first and second selectable outputs.

4. The system of claim 2, further comprising an electronic control module electrically connected to said washer fluid delivery system and said spray delivery selector, wherein said electronic control module actuates the selection by said spray delivery selector of any of said first and second selectable outputs.

5. The system of claim 4, wherein the actuation of the selection is responsive to speed of the motor vehicle.

6. The system of claim 5, wherein the actuation of the selection is responsive to a predetermined threshold speed, wherein at and below said threshold speed, the actuation of the selection comprises said spray delivery selector selecting said first selectable output thereof, and wherein above said threshold speed, the actuation of the selection comprises said spray delivery selector selecting said second selectable output thereof.

7. The system of claim 4, further comprising a manually actuated switch which actuates the selection by said spray delivery selector of any of said first and second selectable outputs.

8. The system of claim 7, wherein said manually actuated switch determines the selection by said spray delivery selector of any of said first and second selectable outputs.

9. The system of claim 4, wherein the actuation of the selection is responsive to a predetermined threshold speed, wherein at and below said threshold speed, the actuation of the selection comprises said spray delivery selector selecting said first selectable output thereof, and wherein above said threshold speed, the actuation of the selection comprises said spray delivery selector selecting said second selectable output thereof.

10. The system of claim 9, wherein said manually actuated switch determines the selection by said spray delivery selector of any of said first and second selectable outputs.

* * * * *